(12) United States Patent
Bartlett et al.

(10) Patent No.: US 7,322,726 B2
(45) Date of Patent: Jan. 29, 2008

(54) ONE HUNDRED AND EIGHTY DEGREE HEADLAMP ADJUSTER

(75) Inventors: Chris Bartlett, Picton (CA); Savo Okuka, Belleville (CA)

(73) Assignee: Magna International Inc., Aurora, Ontario (CA)

( * ) Notice: Subject to any disclaimer, the term of this patent is extended or adjusted under 35 U.S.C. 154(b) by 38 days.

(21) Appl. No.: 11/303,837

(22) Filed: Dec. 16, 2005

(65) Prior Publication Data

US 2007/0139947 A1   Jun. 21, 2007

(51) Int. Cl.
*F21V 7/16* (2006.01)
(52) U.S. Cl. .................................... 362/514
(58) Field of Classification Search ........ 362/523, 362/514
See application file for complete search history.

(56) References Cited

U.S. PATENT DOCUMENTS

| 7,004,607 | B2 * | 2/2006 | Aguinaga | 362/528 |
| 7,052,164 | B2 * | 5/2006 | Burton | 362/507 |
| 7,114,835 | B2 * | 10/2006 | Brazas | 362/460 |
| 7,118,259 | B2 * | 10/2006 | Fladhammer | 362/515 |
| 2005/0083708 | A1 * | 4/2005 | Miller et al. | 362/523 |

* cited by examiner

*Primary Examiner*—Hargobind S. Sawhney
(74) *Attorney, Agent, or Firm*—Clark Hill PLC

(57) ABSTRACT

A headlamp with a cost effective and simple headlamp adjuster is provided which allows adjustment of the aim of headlamps from the front of the headlamp with an adjusting tool. In many circumstances, the adjusting tool will be a commonly and readily available tool, such as a Philips screw driver, but it is also contemplated that an adjusting tool with a proprietary end shape can also be employed.

2 Claims, 3 Drawing Sheets

ONE HUNDRED AND EIGHTY DEGREE HEADLAMP ADJUSTER

FIELD OF THE INVENTION

The present invention relates to a headlamp adjuster mechanism. More specifically, the present invention relates to a one hundred and eighty degree headlamp adjuster mechanism.

BACKGROUND OF THE INVENTION

Headlamp adjuster mechanisms to adjust the vertical aim of vehicle headlamps are well known. Such mechanisms generally comprise an adjuster screw, extending toward the rear of the headlamp, the adjuster screw rotatably engaging a fixed member and being threaded through the headlamp reflector or, more commonly, through an insert attached to the reflector and the reflector is pivotally mounted to the headlamp. Rotation of the adjuster screw causes the reflector to move along the adjuster screw, pivoting with respect to the headlamp, to tilt up or down, adjusting the aim of the headlamp.

Known headlamp adjuster mechanisms generally fall into either the ninety degree adjuster category or the one hundred and eighty degree adjuster category. Ninety degree adjusters are those in which the adjustment is effected by rotating a member which extends at ninety degrees to the adjuster screw and engages the adjuster screw through a gear system such that rotation of the member rotates the adjuster screw. Examples include mechanisms wherein the user turns an adjuster rod, extending vertically upward from the adjuster screw, behind the headlamp assembly in the engine compartment of the vehicle.

Similarly, one hundred and eighty degree adjusters include an adjusting member which extends from the headlamp towards the front of the vehicle, beside the headlamp, and rotation of this adjusting member causes rotation of the adjuster screw through a gear system.

While one hundred and eighty degree adjuster mechanisms are generally preferred, they do suffer from disadvantages. In particular, the adjusting member typically must be relatively long to reach from the adjuster screw at the rear of the headlamp to the front of the headlamp and thus the adjusting member can represent a relatively large proportion of the manufacturing cost of the headlamp adjuster mechanism and the weight of the adjusting member is always present on the vehicle, decreasing vehicle fuel economy, despite the fact that headlamps are generally adjusted very infrequently. Further, mounting the adjusting member to ensure that it will be operable over its expected lifetime, despite the harsh environment it is exposed to, and to prevent rattling or vibration of the adjusting member during operation of the vehicle, can be difficult to achieve. Also, during assembly of the headlamp it can be difficult to align the adjusting member with respect to the adjuster screw and headlamp housing.

SUMMARY OF THE INVENTION

It is an object of the present invention to provide a novel one hundred and eighty degree headlamp adjuster mechanism which obviates or mitigates at least one disadvantage of the prior art.

According to a first aspect of the present invention, a one hundred and eighty degree headlamp adjuster mechanism is provided for a headlamp. The headlamp includes an adjuster gear that has a set of peripherally extending gear teeth, an adjuster screw having one end that rotatably engages a pivotable reflector, a second end that engages the adjuster gear and a threaded portion that engages a fixed member of the headlamp, and a guide member that extends from the front of the headlamp to the adjuster gear. The guide member directs an adjusting tool inserted adjacent the front of the headlamp to the adjuster gear. The adjusting tool engages the gear teeth of the adjuster gear. An adjuster gear cap is mounted over the face of the adjuster gear distal the front of the headlamp. The gear cap provides an abutment surface to maintain, in combination with the guide member, the adjusting tool in engagement with the gear teeth, such that rotation of the adjusting tool rotates the adjuster gear and the adjuster screw to adjust the aim of the headlamp.

According to another aspect of the present invention, there is provided a headlamp including a one hundred and eighty degree adjuster mechanism. The headlamp includes an outer housing for mounting the headlamp to a vehicle. A reflector on which the headlamp bulb is mounted, is pivotally mounted within the outer housing to allow aiming of the headlamp. An adjuster gear has a set of peripherally extending gear teeth. An adjuster screw has one end rotatably engages the reflector, a second end that engages the adjuster gear and a threaded portion that engages the outer housing; A guide member extends from the front of the headlamp to the adjuster gear. The guide member directs an adjusting tool inserted adjacent the front of the headlamp to the adjuster gear. The adjusting tool engages the gear teeth of the adjuster gear. An adjuster gear cap is mounted over the face of the adjuster gear distal the front of the headlamp. The gear cap provides an abutment surface to maintain, in combination with the guide member, adjusting tool in engagement with the gear teeth, such that rotation of the adjusting tool rotates the adjuster gear and the adjuster screw to adjust the aim of the headlamp.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
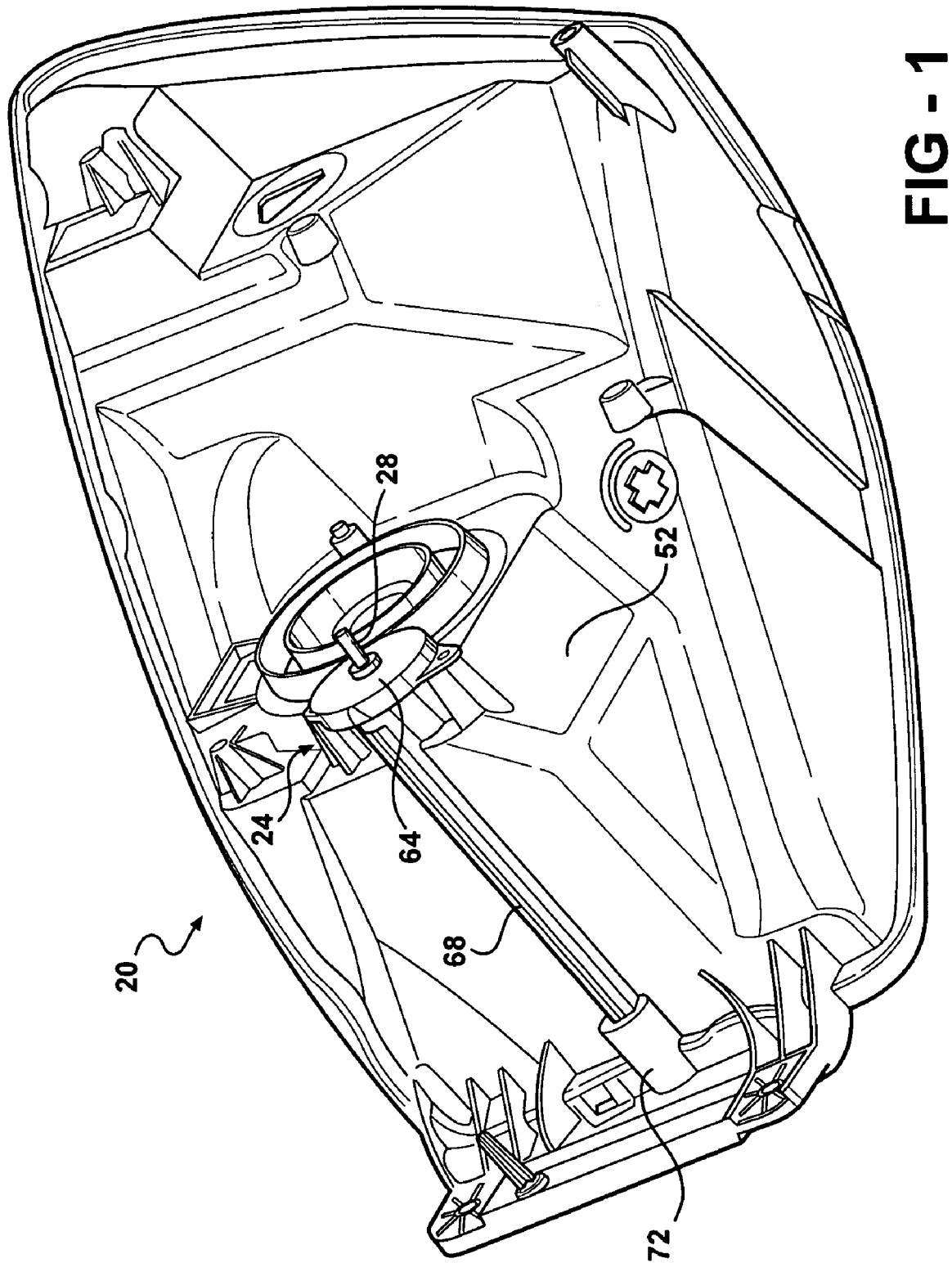
FIG. 1 shows a rear perspective view of a headlamp employing a headlamp adjuster in accordance with the present invention.
Figure 2:
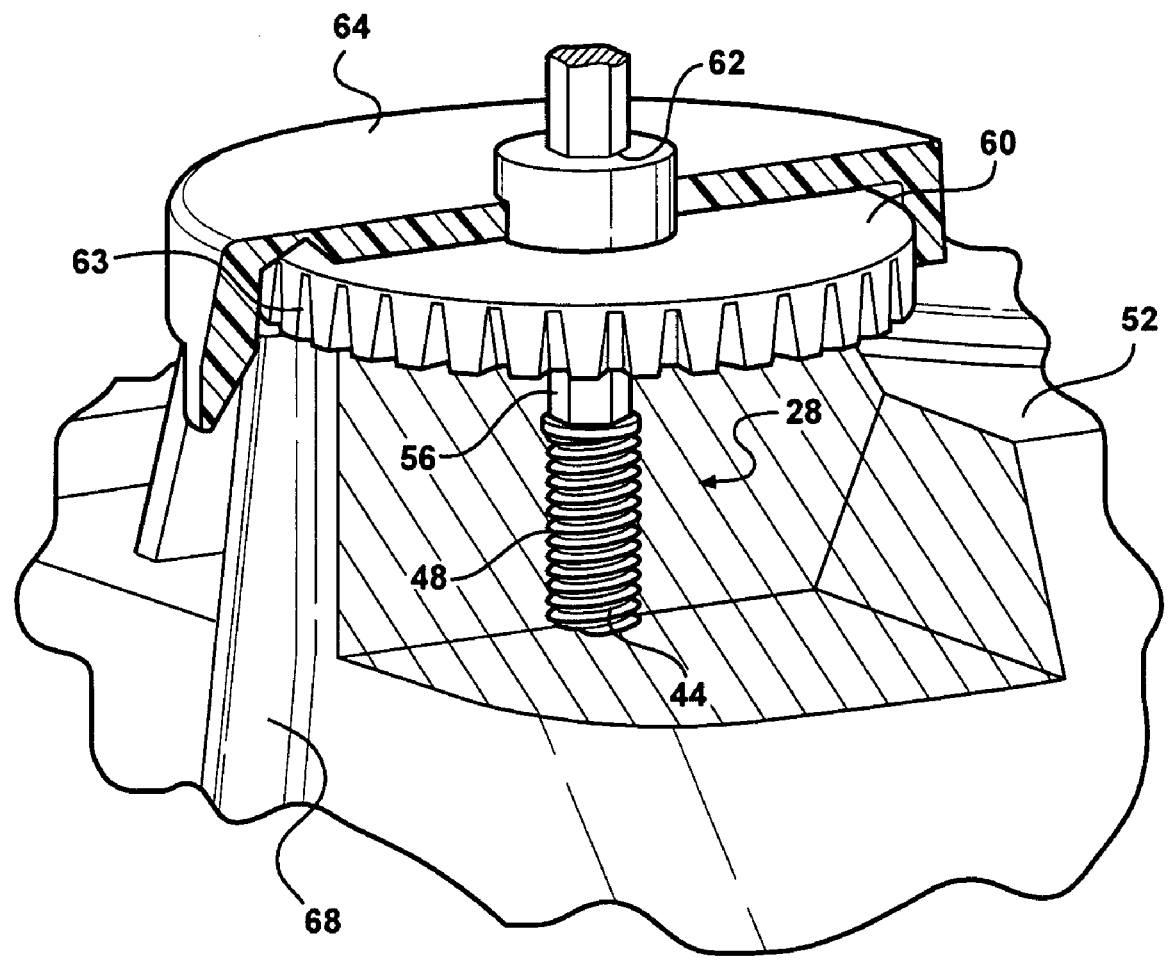
FIG. 2 shows a side, partially cut away, view of a portion of the head lamp adjuster of FIG. 1.
Figure 3:
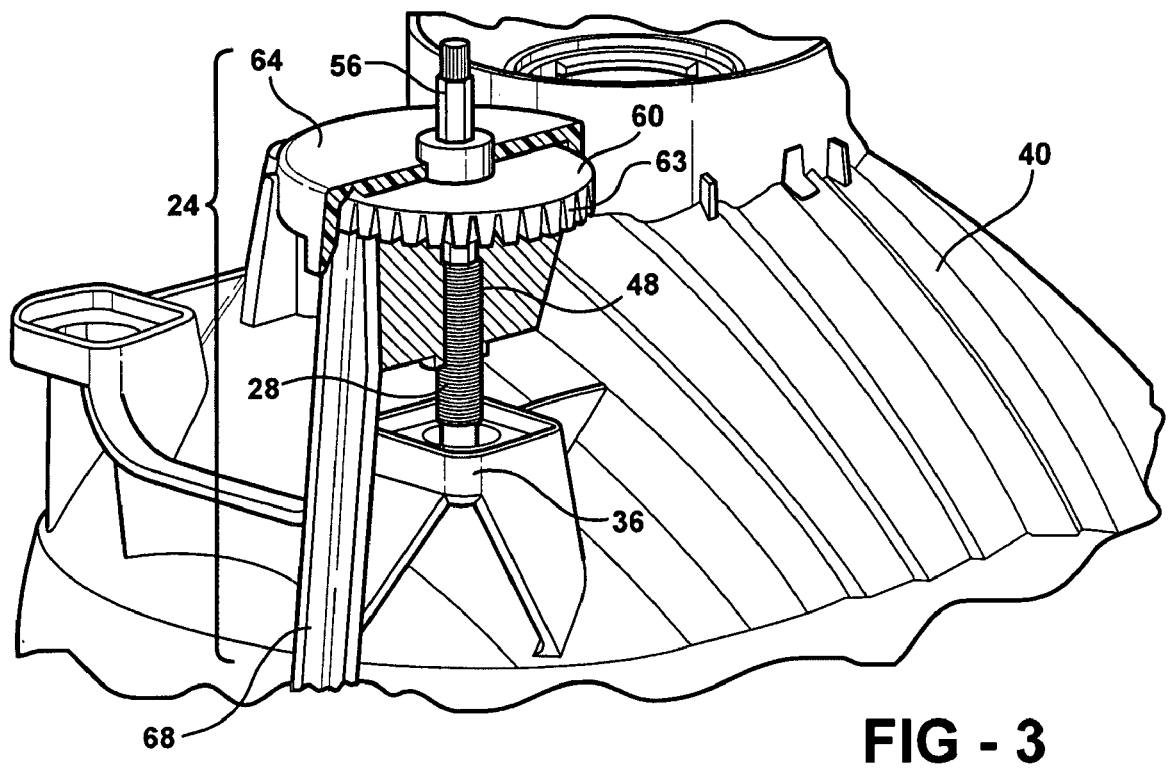
FIG. 3 shows cut away view of the adjuster mechanism and the headlamp reflector of the headlamp of FIG. 1.
Figure 4:
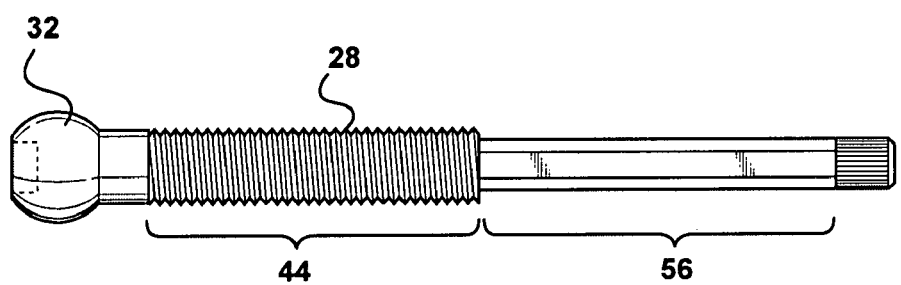
FIG. 4 shows a side view of an adjuster screw from the headlamp adjuster.

A headlamp for a motor vehicle is indicated generally at 20 in FIG. 1 and headlamp 20 includes a one hundred and eighty degree adjuster 24 in accordance with the present invention. As used herein, the term "headlamp" is intended to comprise vehicle headlamps and also any other aimed lighting system for vehicles including, without limitation, driving lights and/or fog lamps.

Referring now to FIGS. 1 through 4, adjuster 24 comprises an adjuster screw 28 which includes a first end 32 which is received in a tab 36 extending from the back of a reflector 40 of headlamp 20. First end 32 of adjuster screw 28 is generally spherical in shape and is received in tab 36 such that it is free to rotate about its longitudinal axis but is held captive against axial movement.

Adjuster screw 28 further includes a threaded portion 44 which engages a bore 48, with complementary internal threads, in an outer housing 52 of headlamp 20. Reflector 40 is pivotally mounted within outer housing 52 such that rotation of adjuster screw 28 in bore 48 moves first end 32 towards or away from the front of headlamp 20, causing reflector 40 to pivot within outer housing 52.

A second end 56 of adjuster screw 28 is keyed to receive an adjuster gear 60, such that adjuster screw 28 will rotate with adjuster gear 60 while allowing adjuster gear 60 to move longitudinally along second end 56. In a present embodiment of the invention, second end 56 is hexagonal in cross section and engages a complementary hexagonal bore 62 in the center of adjuster gear 60. However, it is contemplated that any suitable manner of keying second end 56 and adjuster gear 60 can be employed as will occur to those of skill in the art.

Adjuster gear 60 includes a set of peripherally extending gear teeth 63 the shape and pitch of which are selected to be complementary to an adjusting tool, as described in more detail below.

An adjuster gear cap 64, which includes a recess complementary in shape and size to the back of adjuster gear 60, is mounted to outer housing 52 over adjuster gear 60 and serves to maintain adjuster gear 60 in place with respect to outer housing 52 while allowing adjuster gear 60 to be rotated with adjuster screw 28.

Adjuster 24 further includes a guide member 68 which extends from adjacent the front of headlamp 20 to the periphery of adjuster gear 60 and adjuster gear cap 64. Guide member 68 has a cross sectional shape which is complementary to the adjusting tool such that the adjusting tool can be inserted into headlamp 20 from the front of headlamp 20, along guide member 68, until the end of the adjusting tool abuts adjuster gear cap 64. Preferably, guide member 68 further includes a portion 72 which is intended to encircle the adjusting tool inserted along guide member 68 to further assist in maintaining the adjusting tool in place when an adjustment is being made.

At this point, one or more features on the end of the adiusting tool engage the complementary gear teeth 63 on adjuster gear 60 such that rotation of the adjusting tool, which acts as a pinion gear and which is maintained in place by guide member 68, will result in rotation of adjuster gear 60 and adjuster screw 28.

It is presently contemplated that the adjusting tool will be a commonly available tool available to a mechanic and, presently, a #2 Philips head screw driver is preferred. However, it will be apparent to those of skill in the art that by changing the pitch and/or shape of the peripheral gear teeth 63 on adjuster gear 60 and/or the shape of guide member 68, a wide variety of other tools can be used as an the adjusting tool, including Torx™ or Robertson screwdrivers, hex drivers, etc. It is also contemplated that, in some circumstances, it may be desired that adjuster 24 require a proprietary adjusting tool and, in such a case, the peripheral gear teeth 63 and guide member 68 can be designed accordingly.

As will now be apparent to those of skill in the art, the present invention provides a cost effective and simple headlamp adjuster which allows adjustment of the aim of headlamps from the front of the headlamp with a suitable a adjusting tool. In many circumstances, the adjusting tool will be a commonly and readily available tool, such as a Philips screw driver, but it is also contemplated that an adjustment tool with a proprietary end shape can also be employed.

Finally, by eliminating the prior art requirement for an adjusting member to extend from the front of the headlamp to the adjuster screw on the back of the headlamp, the expense of the additional component is avoided while the possibility of that component noticeably vibrating or rattling is also avoided. The above-described embodiments of the invention are intended to be examples of the present invention and alterations and modifications may be effected thereto, by those of skill in the art, without departing from the scope of the invention which is defined solely by the claims appended hereto.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A one hundred and eighty degree headlamp adjuster mechanism for a headlamp having a fixed member and a pivotable reflector that is adjusted by an adjusting tool, the headlamp adjuster comprising:
    a single adjuster gear positioned at back end of the reflector and having a set of peripherally extending gear teeth;
    an adjuster screw having one end rotatably engaging the pivotable reflector, a second end directly engaging the adjuster gear and a threaded portion engaging the fixed member of the headlamp;
    a guide member extending from an outboard edge of the headlamp to the adjuster gear, the guide member directing the adjusting tool inserted adjacent the outboard edge of the headlamp to the adjuster gear, the adjusting tool directly engaging the gear teeth of the adjuster gear; and
    an adjuster gear cap mounted over the face of the adjuster gear distal the outboard edge of the headlamp, the gear cap providing an abutment surface to maintain, in combination with the guide member, the adjusting tool in engagement with the gear teeth, such that rotation of the adjusting tool rotates the adjuster gear and the adjuster screw to adjust the aim of the headlamp.

2. A headlamp for a motor vehicle including a one hundred and eighty degree adjuster mechanism that is adjusted by an adjusting tool, the headlamp comprising:
    an outer housing for mounting the headlamp to the motor vehicle;
    a reflector on which the headlamp bulb is mounted, the reflector being pivotally mounted within the outer housing to allow aiming of the headlamp;
    a single adjuster gear positioned at back end of the reflector and having a set of peripherally extending gear teeth;
    an adjuster screw having one end rotatably directly engaging the reflector, a second end engaging the adjuster gear and a threaded portion engaging the outer housing;
    a guide member extending from an outboard edge of the headlamp to the adjuster gear, the guide member directing the adjusting tool inserted adjacent the an outboard edge of the headlamp to the adjuster gear, the adjusting tool directly engaging the gear teeth of the adjuster gear; and an adjuster gear cap mounted over the face of the adjuster gear distal the outboard edge of the headlamp, the gear cap providing an abutment surface to maintain, in combination with the guide member, the adjusting tool in engagement with the gear teeth, such that rotation of the adjusting tool rotates the adjuster gear and the adjuster screw to adjust the aim of the headlamp.

* * * * *